United States Patent
Lum et al.

(10) Patent No.: US 8,208,867 B2
(45) Date of Patent: Jun. 26, 2012

(54) SHARED MULTIBAND ANTENNAS AND ANTENNA DIVERSITY CIRCUITRY FOR ELECTRONIC DEVICES

(75) Inventors: Nicholas W. Lum, Santa Clara, CA (US); Louie J. Sanguinetti, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 497 days.

(21) Appl. No.: 12/421,178

(22) Filed: Apr. 9, 2009

(65) Prior Publication Data

US 2010/0260082 A1 Oct. 14, 2010

(51) Int. Cl.
*H04B 1/46* (2006.01)

(52) U.S. Cl. .......................................... 455/78
(58) Field of Classification Search .................. 455/78
See application file for complete search history.

(56) References Cited

U.S. PATENT DOCUMENTS

| | | | |
|---|---|---|---|
| 5,715,525 A * | 2/1998 | Tarusawa et al. | 455/101 |
| 5,794,159 A * | 8/1998 | Portin | 455/553.1 |
| 5,812,939 A * | 9/1998 | Kohama | 455/78 |
| 5,881,370 A | 3/1999 | Pottala et al. | |
| 6,553,210 B1 | 4/2003 | Lindemann et al. | |
| 6,560,443 B1 * | 5/2003 | Vaisanen et al. | 455/73 |
| 6,717,516 B2 | 4/2004 | Bridgelall | |
| 6,813,320 B1 | 11/2004 | Claxton et al. | |
| 6,882,631 B1 | 4/2005 | Tiedemann | |
| 7,106,816 B2 | 9/2006 | Filipovic | |
| 7,116,952 B2 * | 10/2006 | Arafa | 455/132 |
| 7,123,883 B2 | 10/2006 | Mages | |
| 7,142,824 B2 * | 11/2006 | Kojima et al. | 455/78 |
| 7,142,884 B2 * | 11/2006 | Hagn | 455/552.1 |
| 7,155,178 B2 * | 12/2006 | Chang et al. | 455/101 |
| 7,251,499 B2 * | 7/2007 | Ella et al. | 455/552.1 |
| 7,313,368 B2 * | 12/2007 | Wu et al. | 455/73 |
| 7,705,692 B2 * | 4/2010 | Fukamachi et al. | 333/109 |
| 7,863,983 B2 * | 1/2011 | Yuen et al. | 330/285 |
| 7,872,547 B2 * | 1/2011 | Song et al. | 333/132 |
| 2003/0050032 A1 * | 3/2003 | Masaki | 455/272 |
| 2004/0166909 A1 * | 8/2004 | Lee | 455/575.7 |
| 2004/0232982 A1 * | 11/2004 | Ichitsubo et al. | 330/129 |
| 2004/0266378 A1 * | 12/2004 | Fukamachi et al. | 455/188.1 |
| 2006/0025171 A1 * | 2/2006 | Ly et al. | 455/553.1 |
| 2006/0030265 A1 | 2/2006 | Desai et al. | |

(Continued)

OTHER PUBLICATIONS

ANADIGICS "AWL6254 Product Brief," Rev 1.2, Sep. 2005.

(Continued)

*Primary Examiner* — Thomas J Hiltunen

(74) *Attorney, Agent, or Firm* — Treyz Law Group; David C. Kellogg; G. Victor Treyz

(57) ABSTRACT

Electronic devices are provided that contain wireless communications circuitry. The wireless communications circuitry may have antenna diversity circuitry that allows an optimum antenna or optimum antennas in an antenna structure to be switched into use during device operations. The antenna structure may be shared between multiple radio-frequency transceivers in a radio-frequency transceiver circuit. The radio-frequency transceiver circuit may be coupled to the antenna structure using switching and filtering circuitry. The filtering circuitry may include one or more diplexers that divide radio-frequency signals into divided signal paths based on frequency. The filtering circuitry may also include low pass, high pass, and bandpass filters that are interposed in the divided signal paths. Switching circuitry in the switching and filtering circuitry may be used to selectively configure the wireless communications circuitry in transmit and receive modes using multiple communications bands.

16 Claims, 10 Drawing Sheets

U.S. PATENT DOCUMENTS

| | | |
|---|---|---|
| 2006/0145782 A1* | 7/2006 | Liu et al. .................. 333/132 |
| 2006/0194538 A1 | 8/2006 | Palin et al. |
| 2006/0205436 A1 | 9/2006 | Liu et al. |
| 2006/0286942 A1* | 12/2006 | Okuyama .................. 455/78 |
| 2008/0139118 A1 | 6/2008 | Sanguinetti et al. |
| 2008/0212552 A1* | 9/2008 | Fukamachi et al. ......... 370/343 |
| 2009/0285135 A1* | 11/2009 | Rousu et al. ............... 370/297 |
| 2009/0289739 A1* | 11/2009 | Sasaki et al. .............. 333/132 |
| 2010/0157860 A1* | 6/2010 | Hagiwara et al. .......... 370/310 |
| 2011/0096763 A1* | 4/2011 | Qi et al. .................... 370/338 |

OTHER PUBLICATIONS

Lum et al., U.S. Appl. No. 12/412,228, filed Mar. 26, 2009.

* cited by examiner

SHARED MULTIBAND ANTENNAS AND ANTENNA DIVERSITY CIRCUITRY FOR ELECTRONIC DEVICES

BACKGROUND

This relates generally to wireless communications circuitry, and more particularly, to electronic devices that support wireless communications in multiple communications bands.

Electronic devices such as handheld electronic devices are becoming increasingly popular. Examples of handheld devices include handheld computers, cellular telephones, media players, and hybrid devices that include the functionality of multiple devices of this type.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band. Electronic devices may use short-range wireless communications links to handle communications with nearby equipment. For example, electronic devices may communicate using the WiFi® (IEEE 802.11) bands at 2.4 GHz and 5 GHz and the Bluetooth° band at 2.4 GHz.

To satisfy consumer demand for small form factor wireless devices, manufacturers are continually striving to reduce the number of components that are used. For example, in some wireless designs a single antenna is shared by two transceivers. Because there is only a single antenna with this type of approach, device size is minimized.

It can be difficult to share an antenna in a wireless device, however, because transceivers compete with each other for use of the antenna. This may lead to conflicts when both transceivers are being used.

It would therefore be desirable to be able to provide improved wireless communications circuitry for wireless electronic devices.

SUMMARY

Electronic devices such as handheld electronic devices and other portable electronic devices may be provided with wireless communications circuitry. The wireless communications circuitry may include transceiver circuitry such as transceivers operating at 2.4 GHz and 5 GHz. The wireless communications circuitry may also include cellular telephone transceivers and other radio-frequency transceivers.

An electronic device may be provided with an antenna structure for handling transmitted and received radio-frequency signals. The antenna structure may have multiple antennas. Each of the antennas in the antenna structure may cover multiple communications bands such as the 2.4 GHz and 5 GHz bands. An antenna diversity switch may be controlled in real time to switch one of the antennas in the antenna structure into use. For example, if a first of the antennas is receiving signals more effectively than a second of the antennas, the antenna diversity switch may be used to switch the first antenna in to use, thereby optimizing wireless performance. With another suitable arrangement, an antenna diversity switch may be controlled in real time to switch a first antenna into use in transmitting wireless signals and a second antenna into use in receiving wireless signals. In this type of arrangement, if the first antenna is transmitting signals more effectively than the second antenna (and any other antennas), the antenna diversity switch may be used to switch the first antenna into use as a transmitting antenna and to switch the second antenna into use as a receiving antenna (as examples), thereby optimizing wireless performance (e.g., optimizing antenna transmission efficiency). Alternatively, if the first antenna is receiving signals more effectively than the second antenna (and any other antennas), the antenna diversity switch may be used to switch the first antenna into use as a receiving antenna and to switch the second antenna into use as a transmitting antenna (as examples), thereby optimizing wireless performance (e.g., optimizing antenna reception efficiency).

The antenna structure may be shared between 2.4 GHz and 5 GHz transceivers using filter and switching circuitry. The filter and switching circuitry may include one or more diplexers that are coupled between multiple communications paths and the antenna diversity switch. Each diplexer may be coupled between first and second communications paths and the antenna diversity switch. The first path may be used to convey radio-frequency signals in a first communications band such as the 2.4 GHz communications band. The second path may be used to convey radio-frequency signals in a second communications band such as the 5 GHz communications band. The diplexers may be formed from a low pass filter (or a corresponding bandpass filter) and a high pass filter (or a corresponding bandpass filter. For example, a diplexer may have a 5 GHz bandpass filter that is coupled to the second path and a 2.4 GHz low pass filter that is coupled to the first path. In another example, a diplexer may have a 5 GHz high pass filter and a 2.4 GHz band pass filter. In general, any suitable combinations of filters may be included in the diplexers.

Low pass, high pass, and/or bandpass filtering circuitry in the filter and switching circuitry may be interposed in the first and second paths. For example, a 2.4 GHz bandpass filter may be interposed in the first path between the transceiver circuitry and the diplexer, whereas a 5 GHz bandpass filter may be interposed in the second path between the transceiver circuitry and the diplexer. With another suitable arrangement, filter and switching circuitry may include a pair of filters (e.g., a 5 GHz bandpass filter and a 2.4 GHz bandpass filter) each of which is coupled between the antenna diversity switch and one of the two communications paths.

Switching circuitry such as two-position switches and three-position switches may be used to configure the device for various 2.4 GHz and 5 GHz transmission and reception modes. For example, the switching circuitry may be configured to support simultaneous signal transmission at 5 GHz and signal reception at 2.4 GHz or may be configured to support simultaneous signal reception at 5 GHz and signal transmission at 2.4 GHz (as examples).

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in multiple wireless communications bands. Antenna resources in an electronic device may be shared between multiple transceivers. For example, a transceiver circuit that is operating in first and second communications bands may share an antenna. More than one antenna may be shared in this way. For example, multiple antennas may be used to implement an antenna diversity scheme in which switching circuitry continuously switches an optimum antenna into use depending on factors such as antenna signal strength.

An electronic device may therefore be provided with an antenna structure that has one or more diversity antennas and multiple transceivers that share the antenna structure. In the same electronic device, additional transceivers may be provided that use separate antennas. For example, an electronic device may contain antenna sharing circuitry that allows IEEE 802.11 (WiFi®) and Bluetooth® transceivers to share antenna resources. The same device may also be provided with additional transceivers such as a cellular telephone transceiver. If desired, the same device may include a global positioning system (GPS) receiver. The antenna sharing circuitry may contain filters that help block cross-talk from the cellular telephone transceiver and the global position system receiver and from leaked versions of transmitted signals while supporting antenna sharing operations between the WiFi and Bluetooth transceivers (as an example).

Any suitable electronic devices may be provided with wireless circuitry that supports antenna resource sharing. As an example, antenna sharing may be supported in electronic devices such as desktop computers, game consoles, routers, laptop computers, etc. With one suitable configuration, antenna sharing circuitry is provided in relatively compact electronic devices in which interior space is relatively valuable such as portable electronic devices.

Figure 1:
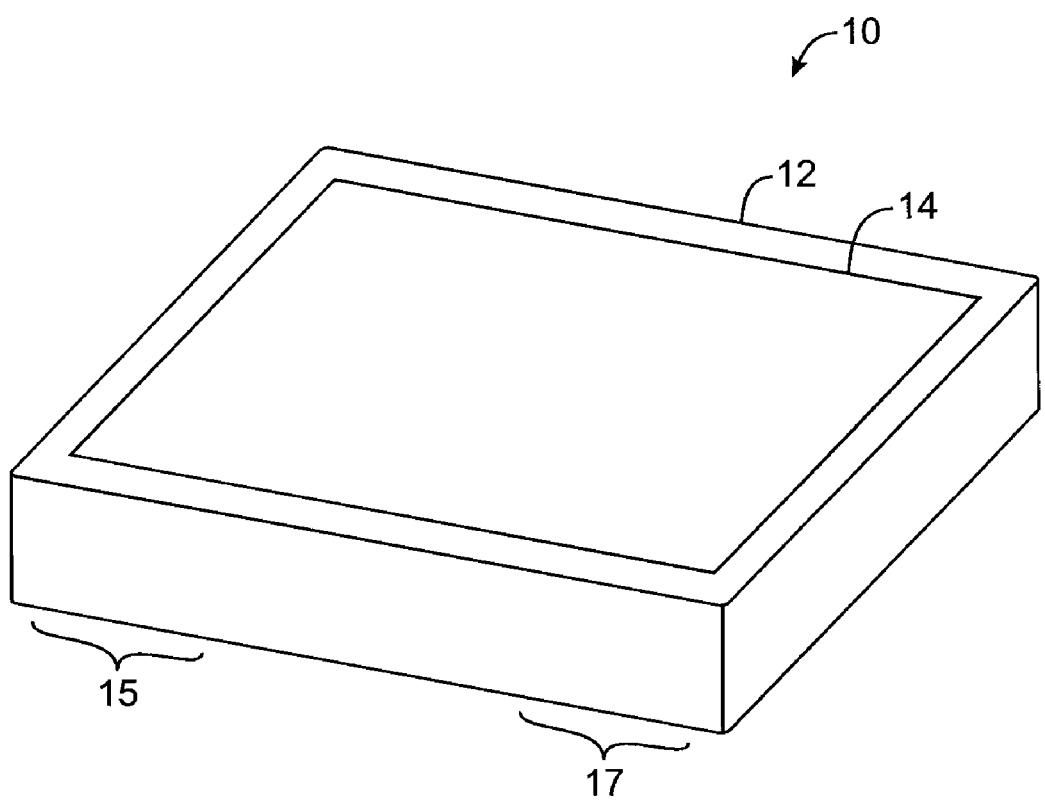
FIG. 1 is a perspective view of an illustrative electronic device with wireless communications circuitry in accordance with an embodiment of the present invention.

An illustrative portable electronic device in accordance with an embodiment of the present invention is shown in FIG. 1. Portable electronic devices such as illustrative portable electronic device 10 may be laptop computers or small portable computers such as ultraportable computers, netbook computers, and tablet computers. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices are handheld electronic devices such as cellular telephones.

Space is at a premium in portable electronic devices, so antenna-sharing arrangements for portable electronic devices can be particularly advantageous. The use of portable devices such as handheld devices is therefore sometimes described herein as an example, although any suitable electronic device may be provided with antenna resource sharing circuitry if desired.

Handheld devices may be, for example, cellular telephones, media players with wireless communications capabilities, handheld computers (also sometimes called personal digital assistants), remote controllers, global positioning system (GPS) devices, and handheld gaming devices. Handheld devices and other portable devices may be hybrid devices that combine the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples. Device 10 may be any suitable portable or handheld electronic device.

Device 10 includes housing 12 and includes at least one antenna for handling wireless communications. Housing 12, which is sometimes referred to as a case, may be formed of any suitable materials including, plastic, wood, glass, ceramics, metal, or other suitable materials, or a combination of these materials. In some situations, case 12 may be a dielectric or other low-conductivity material, so that the operation of conductive antenna elements that are located in proximity to case 12 is not disrupted. In other situations, case 12 may be formed from metal elements.

Any suitable type of antenna may be used to support wireless communications in device 10. Examples of suitable antenna types include antennas with resonating elements that are formed from a patch antenna structure, a planar inverted-F antenna structure, a helical antenna structure, etc. To minimize device volume, at least one of the antennas in device 10 may be shared between two transceiver circuits.

Handheld electronic device 10 may have input-output circuitry 14. Circuitry 14 may include devices such as a display screen, buttons, alphanumeric keys, touch pads, pointing sticks, and other user input control devices for receiving user input, and input-output components such as input-output ports. Device 10 may use any suitable type of display such as a liquid crystal display (LCD), an organic light-emitting diode (OLED) display, a plasma display, or multiple displays that use one or more different display technologies. Display screens can be mounted on the front face of handheld electronic device 10 as shown by circuitry 14 in FIG. 1. If desired, displays can be mounted on the rear face of handheld electronic device 10, on a side of device 10, on a flip-up portion of device 10 that is attached to a main body portion of device 10 by a hinge (for example), or using any other suitable mounting arrangement.

Device 10 may interact with external equipment wirelessly. If desired, antenna diversity arrangements may be implemented in device 10 in which multiple redundant antennas are used to transmit and receive signals. The antennas in an antenna diversity arrangement may be located in different portions of device 10. For example, a first antenna may be located in region 15, whereas a second antenna may be located in region 17. During operation of the wireless antennas, antenna diversity circuitry in device 10 may make signal strength readings or other appropriate readings in real time to continuously determine which antenna is performing best. The antenna diversity circuitry can then ensure that the optimum antenna is switched into use, maximizing wireless performance in device 10.

With one suitable arrangement, the antenna diversity circuitry can be used to ensure that wireless communications are not disabled when one or more antennas in device 10 are malfunctioning (i.e., when an antenna is broken from inadvertently dropping device 10 on a hard surface). For example, when at least one antenna in device 10 remains functional, the antenna diversity circuitry can ensure that the functional antenna is switched into use, maintaining wireless functionality in device 10.

Figure 2:
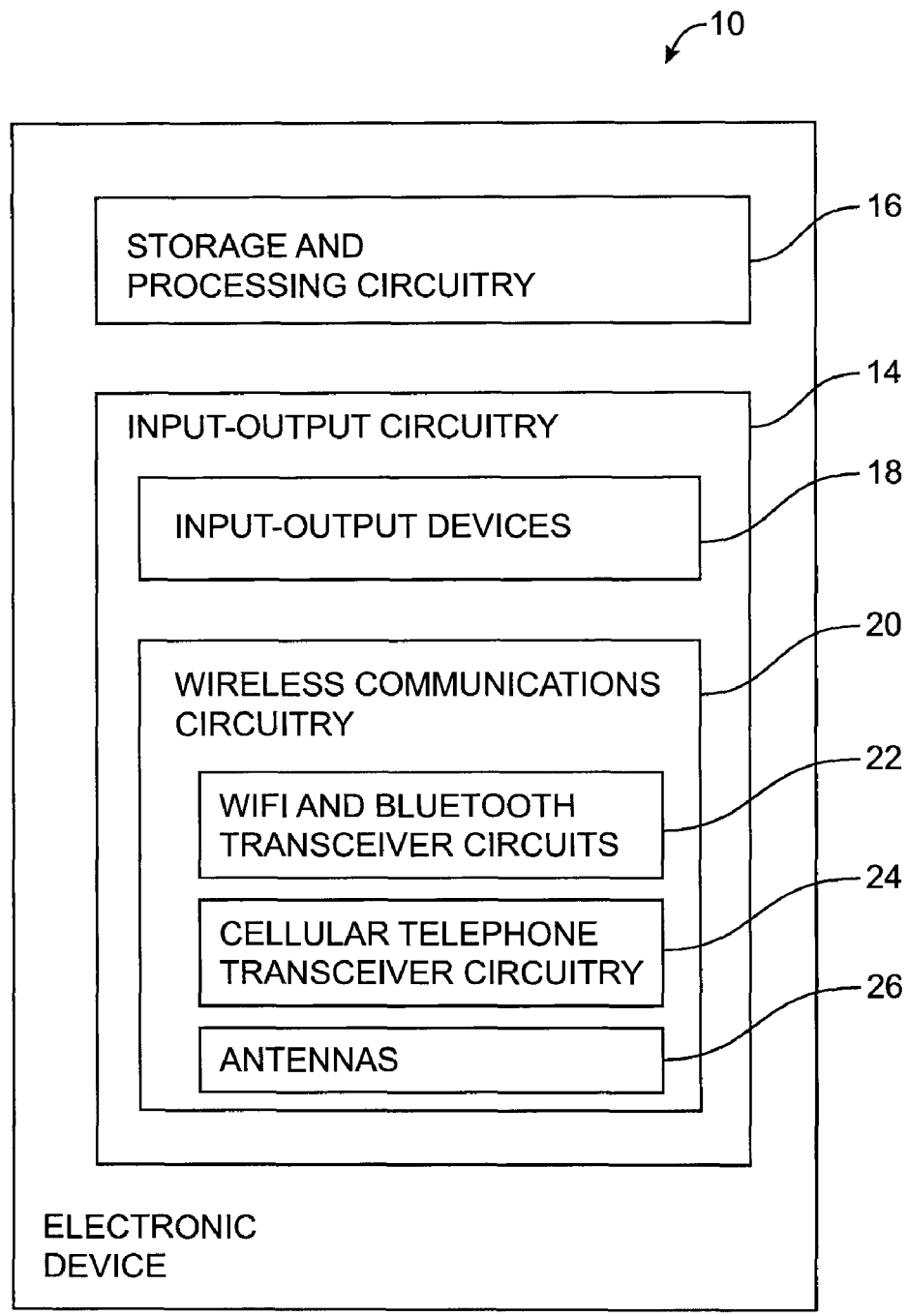
FIG. 2 is a schematic diagram of an illustrative electronic device with wireless communications circuitry in accordance with an embodiment of the present invention.

A schematic diagram of an embodiment of an illustrative handheld electronic device is shown in FIG. 2. Handheld device 10 may be a portable computer such as a portable tablet computer, a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 16 may be used to control the operation of device 10. Processing circuitry 16 may be based on a processor such as a microprocessor and other suitable integrated circuits. With one suitable arrangement, storage and processing circuitry 16 may be used to run software on device 10, such as internet browsing applications, voice-over-internet-protocol (VoIP) telephone call applications, email applications, media playback applications, operating system functions, etc. Storage and processing circuitry 16 may be used in implementing suitable communications protocols and may be used in implementing antenna diversity schemes. Communications protocols that may be implemented using storage and processing circuitry 16 include internet protocols, wireless local area network protocols (e.g., IEEE 802.11 protocols—sometimes referred to as WiFi®), protocols for other short-range wireless communications links such as the Bluetooth° protocol, etc.

Input-output circuitry 14 may be used to allow data to be supplied to device 10 and to allow data to be provided from device 10 to external devices. Input-output devices 18 such as touch screens and other user input interface are examples of input-output circuitry 14. Input-output devices 18 may also include user input-output devices such as buttons, joysticks, click wheels, scrolling wheels, touch pads, key pads, keyboards, microphones, cameras, etc. A user can control the operation of device 10 by supplying commands through such user input devices. Display and audio devices may be included in devices 18 such as liquid-crystal display (LCD) screens, light-emitting diodes (LEDs), and other components that present visual information and status data. Display and audio components in input-output devices 18 may also include audio equipment such as speakers and other devices for creating sound. If desired, input-output devices 18 may contain audio-video interface equipment such as jacks and other connectors for external headphones and monitors.

Wireless communications circuitry 20 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). Wireless communications circuitry 20 may include radio-frequency transceiver circuits for handling multiple radio-frequency communications bands. For example, circuitry 20 may include transceiver circuitry 22 that handles 2.4 GHz and 5 GHz bands for WiFi (IEEE 802.11) communications and the 2.4 GHz Bluetooth communications band. Circuitry 20 may also include cellular telephone transceiver circuitry 24 for handling wireless communications in cellular telephone bands such as the GSM bands at 850 MHz, 900 MHz, 1800 MHz, and 1900 MHz, and the 2100 MHz data band (as examples). Wireless communications circuitry 20 can include circuitry for other short-range and long-range wireless links if desired. For example, wireless communications circuitry 20 may include global positioning system (GPS) receiver equipment, wireless circuitry for receiving radio and television signals, paging circuits, etc. In WiFi and Bluetooth links and other short-range wireless links, wireless signals are typically used to convey data over tens or hundreds of feet. In cellular telephone links and other long-range links, wireless signals are typically used to convey data over thousands of feet or miles.

Wireless communications circuitry 20 may include antennas 26. Antennas 26 may be formed using any suitable antenna types. Examples of suitable antenna types for antennas 26 include antennas with resonating elements that are formed from patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link.

Examples of local wireless links include WiFi and Bluetooth links and wireless universal serial bus (USB) links. Because WiFi links are typically used to establish data links with local area networks, links such as WiFi links are sometimes referred to as wireless local area network (WLAN) links.

Local wireless links may operate in any suitable frequency band. For example, WLAN links may operate at 2.4 GHz and 5 GHz (as examples), whereas Bluetooth links may operate at 2.4 GHz. The frequencies of the WLAN channels that are used in supporting these local links in device 10 may depend on the country in which device 10 is being deployed (e.g., to comply with local regulations), the available hardware of the WLAN or other equipment with which device 10 is connecting, and other factors.

With one suitable arrangement, which is sometimes described herein as an example, device 10 includes long-range wireless circuitry such as cellular telephone transceiver circuitry 24 and short-range circuitry such as transceiver circuits 22. Circuitry 24 may operate with a single long-range link antenna (e.g., a multiband cellular telephone antenna). Circuitry 22 may support communications in both the 2.4 GHz and 5 GHz WiFi bands and in the 2.4 GHz Bluetooth band using a shared antenna or shared antennas.

In devices that do not have multiple antennas for implementing an antenna diversity scheme, circuitry 22 may include sharing circuitry that allows multiple transceiver circuits to share a single multiband antenna. For example, sharing circuitry may be used to allow a WiFi transceiver that operates at 2.4 GHz and at 5 GHz to share the same antenna as a Bluetooth transceiver that operates at 2.4 GHz.

The same type of sharing scheme may be implemented in devices 10 that have multiple antennas arranged to support an antenna diversity scheme. To support antenna diversity, multiple antennas are provided each of which may cover the same communications bands (e.g., bands at 2.4 GHz and 5 GHz). Antenna diversity switching circuitry may be used to switch an optimum one of the antennas into use at a given time. In a typical scenario, signal strength monitoring circuitry or other control circuitry may make measurements in real time to determine which of the antennas is providing the best performance (e.g., maximum signal strength) in the current environment for device 10. With one suitable arrangement, signal strength monitoring circuitry or other control circuitry may make receiver power measurements and/or signal strength measurements for each of the appropriate antennas in device 10 during the preamble window of each incoming data packet (as an example). The preamble window may be transmitted and received over approximately 10 microseconds and an average data packet may be transmitted and received over approximately 10 milliseconds (as an example). With this type of arrangement, device 10 may determine which of the antennas is providing the best performance using measurements made during the approximately 10 microsecond time frame of the preamble window. Based on these measurements, the control circuitry may direct the antenna diversity switching circuitry to switch the optimum antenna into use. As a user moves device 10 and covers various parts of device 10 with the user's hands, antenna performance may be degraded. With the antenna diversity scheme, the unblocked antenna (if available) can be switched into use.

Device 10 may include sharing circuitry that allows multiple transceivers to share a single antenna or that allows multiple transceivers to share a single antenna structure containing multiple subantennas in a diversity arrangement. For clarity, the antenna sharing operations of device 10 are sometimes described in connection with arrangements in which the shared antenna structures include multiple antennas arranged in an antenna diversity configuration. This is, however, merely illustrative. Antenna sharing circuitry in device 10 may be used to allow any suitable transceivers to share any suitable antenna structures if desired.

With an illustrative antenna sharing arrangement, the shared antenna structures may be designed to operate at frequencies of both 2.4 GHz and 5 GHz, so the shared antenna structures are suitable for use with both the 2.4 GHz radio-frequency signals that are used in connection with both the WiFi and Bluetooth communications protocols and the 5 GHz radio-frequency signals that are used in connection with WiFi communications protocols.

Figure 3:
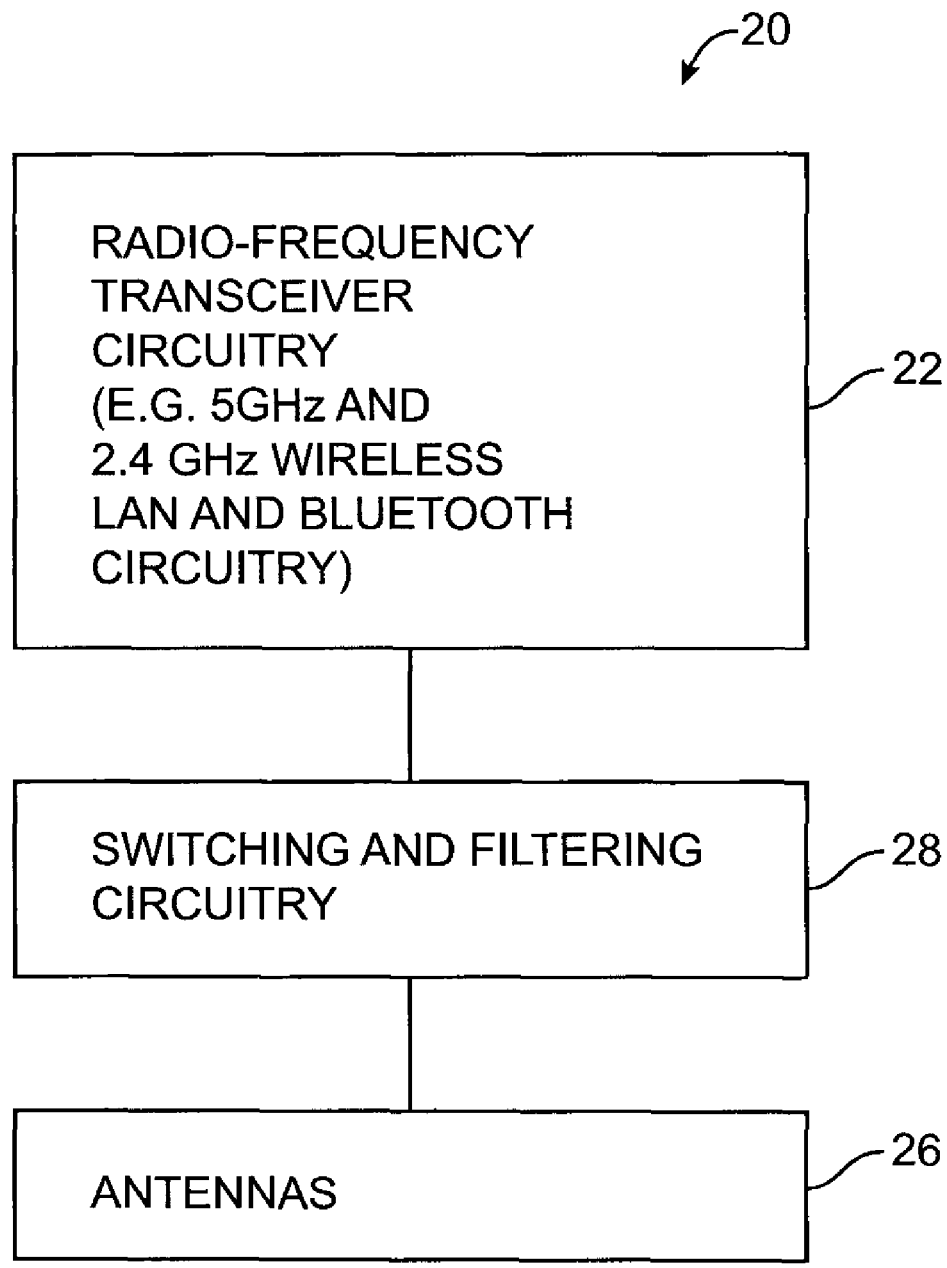
FIG. 3 is a schematic diagram of wireless communications circuitry for a wireless electronic device in accordance with an embodiment of the present invention.

FIG. 3 shows how wireless communications circuitry 20 may have switching and filtering circuitry 28. Switching and filtering circuitry 28 may include antenna sharing circuitry that selectively couples multiple transceivers in radio-frequency transceiver circuitry 22 to antennas 26. Radio-frequency transceiver circuitry 22 may include a WiFi transceiver (radio) for handling WiFi signals at 2.4 GHz and 5 GHz and a Bluetooth transceiver (radio) for handling Bluetooth signals at 2.4 GHz. These radios may be provided using a single integrated circuit or using two or more integrated circuits. Antennas 26 may include multiple antennas arranged in an antenna diversity configuration. Each of the multiple antennas may be configured to handle signals at 2.4 GHz and 5 GHz. Circuitry 28 may include switches such as transistor-based switches, amplifiers such as power amplifiers and low-noise amplifiers, discrete components such as inductors, capacitors, and resistors, etc.

Figure 4:
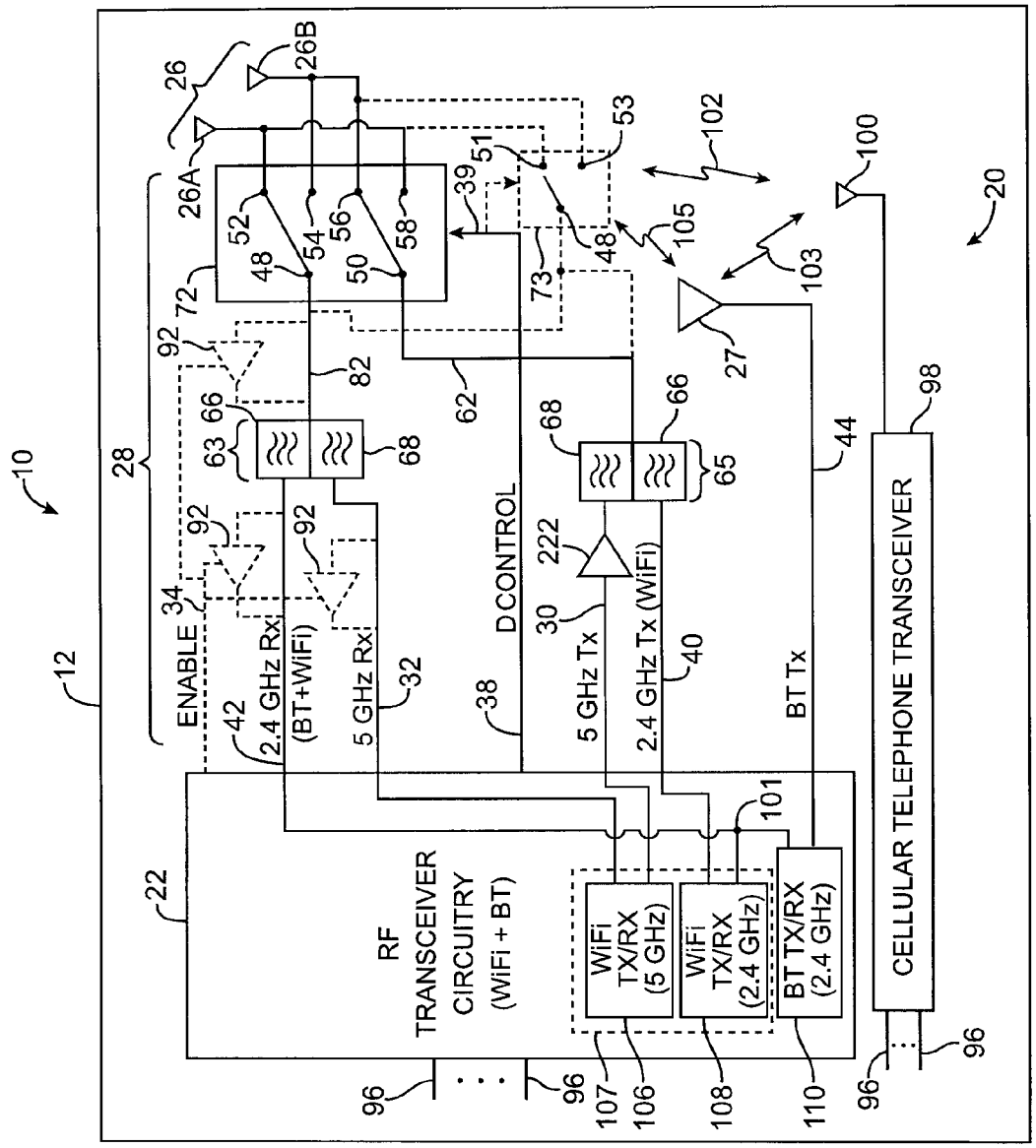
FIG. 4 is a detailed schematic diagram of wireless communications circuitry that may include two diplexers and a switch for a wireless electronic device in accordance with an embodiment of the present invention.

FIGS. 4, 5, 6, 7, 8, 9, and 10 illustrate various arrangements for providing wireless communications circuitry 20. As shown in FIG. 4 (as an example), circuitry 20 may include radio-frequency transceiver circuitry 22. Radio-frequency transceiver circuitry 22 may include WiFi and Bluetooth transceivers (as an example). The WiFi transceiver may operate in the 2.4 GHz WiFi communications band and the 5 GHz WiFi communications band. The Bluetooth transceiver may operate in the 2.4 GHz band. These transceiver circuits may be provided using one, two, three, or more than three transceiver circuits. In the example of FIG. 4, circuitry 22 is shown as containing a WiFi transceiver for 5 GHz operation (transceiver 106), a WiFi transceiver for 2.4 GHz operation (transceiver 108), and a Bluetooth transceiver for 2.4 GHz operation (transceiver 110). These circuits may be implemented using different portions of one or more integrated circuits and may be organized in a variety of configurations. As an example, circuitry 22 may have a WiFi block or chip such as transceiver 107 (illustrated by the dashed lines around transceivers 106 and 108) that serves to implement both 5 GHz and 2.4 GHz WiFi transceiver functions in a single transceiver integrated circuit. The examples of circuitry 20 and circuitry 22 shown in FIG. 4 may also be applied to the circuits of FIGS. 5, 6, 7, 8, 9, and 10, if desired.

With one suitable arrangement, paths 30 and 32 may be coupled to 5 GHz WiFi transceiver 106, paths 40 and 42 may be coupled to 2.4 GHz WiFi transceiver 108, and paths 42 and 44 may be coupled to Bluetooth transceiver 110. Transceivers 108 and 110 may be coupled to path 42 through a splitter such as splitter 101 or other suitable circuitry. If transceivers 106 and 108 are combined into a single transceiver such as chip 107, paths 30, 32, 40, and 42 may be coupled to chip 107. There are merely illustrative examples.

Circuitry 20 may also include other radio-frequency transceiver circuitry such as illustrative cellular telephone transceiver circuitry 98. Radio-frequency receivers and other circuits may be used to receive GPS signals, radio and video signals, other communications signals, etc. Circuitry 20 is depicted as containing radio-frequency transceiver circuitry 22 and radio-frequency transceiver circuitry 98. This is, however, merely illustrative. Wireless communications circuitry 20 may include any suitable wireless circuitry if desired.

Circuitry 22 and circuitry 98 may include resources that serve as control circuits and may therefore be considered to serve as some of the storage and processing circuitry that is depicted as storage and processing circuitry 16 of FIG. 2. Wireless communications circuitry 20 may also be interconnected with other storage and processing circuits.

For example, conductive paths 96 may be used to interconnect radio-frequency transceiver circuitry 22 and radio-frequency transceiver circuitry 98 to control circuitry in device 10 (e.g., storage and processing circuitry 16 of FIG. 2). Paths 96 may be used for power supply signals (e.g., one or more positive power supply voltages and one or more ground voltages), input and output data signals (e.g., general purpose input-output or GPIO signals), serial and parallel port signals (e.g., universal asynchronous receiver transmitter or UART signals), testing signals (e.g., testing signals compliant with Joint Test Action Group or JTAG protocols), pulse-code-modulation (PCM) signals (e.g., audio signals), WLAN data and Bluetooth data, clock signals, power management signals, other control and data signals, etc.

Radio-frequency transceiver circuitry 22 may transmit and receive radio-frequency signals using antennas 26 and, if desired, antenna 27. As one example, antenna 27 may be a dedicated Bluetooth antenna (e.g., a 2.4 GHz antenna used by device 10 to transmit Bluetooth signals). Circuitry 20 may include multiple antennas 26 that are arranged to implement an antenna diversity scheme. As an example, antennas 26 include a first antenna such as antenna 26A and a second antenna such as antenna 26B. These antennas are connected to switching circuitry 72. Switching circuitry 72 may be controlled in real time to ensure that antenna performance is maximized.

Switching circuitry 72 may be implemented using a double pole, double throw (DPDT) switch. With this type of arrangement, switching circuitry 72 may be used to selectively route transmission signals to the antenna with the best (current) performance while routing signals from the other antenna to receiver circuitry. When, for example, antenna 26A is performing better than antenna 26B, switching circuitry 72 may be used to switch antenna 26A into use for wireless transmissions by coupling antenna 26A to lines carrying transmission signals (e.g., coupling antenna 26A to path 62) and to switch antenna 26B into use by coupling antenna 26B to wireless receivers in circuitry 22 through receiver lines (e.g., coupling antenna 26B to path 82). When, for example, antenna 26B is performing better than antenna 26A, switching circuitry 72 may be used to switch antenna 26B into use for wireless transmissions by coupling antenna 26B to lines carrying transmission signals (e.g., coupling antenna 26B to path 62) and to switch antenna 26A into use by coupling antenna 26A to wireless receivers in circuitry 22 through receiver lines (e.g., coupling antenna 26A to path 82). Antennas 26A and 26B work together to handle signals for radio-frequency transceiver circuitry 22 and are sometimes collectively referred to as an antenna or antenna structure.

During operation, the control circuitry of transceiver circuitry 22 may produce control signals DCONTROL on one or more lines in control path 38. The control signals DCONTROL may be routed to the control input of switch 72 and may be used to control whether terminals 48 and 50 are connected to terminals 52 and 56 (respectively) or whether terminals 48 and 50 are connected to terminals 54 and 58 (respectively). Antenna selection decisions may be based on received signal quality measurements (e.g., on a packet-by-packet basis) or any other suitable input. Based on this input, circuitry 22 may generate control signals DCONTROL that place switch 72 in a state that switches an optimum antenna into use for transmission operations (i.e., antenna 26A or 26B in the FIG. 4 example). If desired, circuitry 22 may switch the optimum antenna into use for receiving operations in situations in which the receiving antenna 26 has insufficient signal quality (e.g., to ensure that receiving operations can continue).

With another suitable arrangement, antenna switching circuitry in circuitry 20 may be implemented using a single pole, double throw (SPDT) switch. This arrangement is illustrated by the dashed lines and interconnections to switching circuitry 73 in FIG. 4 (and in FIGS. 6 and 9). When antenna 26A is performing better than antenna 26B, switching circuitry 73 may be used to switch antenna 26A into use by radio-frequency transceiver circuitry 22, as an example. When antenna 26B is performing better than antenna 26A, antenna 26B can be used by radio-frequency transceiver circuitry 22.

With this type of arrangement, the control circuitry of transceiver circuitry 22 may produce control signals DCONTROL on one or more lines in control path 39 during operation. The control signals DCONTROL may be routed to the control input of switch 73 and may be used to control whether terminal 49 is connected to terminal 51 or to terminal 53 (e.g., antenna 26A or antenna 26B, respectively). Antenna selection decisions may be based on received signal quality measurements (e.g., on a packet-by-packet basis) or any other suitable input. Based on this input, circuitry 22 may generate control signals DCONTROL that place switch 73 in a state that switches an optimum antenna into use (i.e., antenna 26A or 26B).

Radio-frequency transceiver circuitry 98 may transmit and receive radio-frequency signals using one or more antennas such as antenna 100. Particularly in compact electronic devices such as handheld electronic devices and other portable electronic devices, there is a relatively short distance between antenna 100, antennas 26, and antenna 27. This can result in potential cross-talk signals such as when transmitted radio-frequency signals from antenna 100 are coupled to antennas 26 via free space path 102, when signals transmitted from antennas 26 are coupled to antenna 100 via path 102, when signals transmitted from antennas 100 are coupled to antenna 27 via free space path 103, when signals transmitted from antennas 26 are coupled to antenna 27 via path 105, and when signals transmitted from antenna 27 are coupled to antennas vias path 105 (as examples). Circuitry 20 may include switching and filter circuitry that effectively suppresses these sources of undesirable crosstalk and thereby ensures proper operation of radio-frequency transceiver circuitry 22 even when radio-frequency transceiver circuitry 98 is operated simultaneously.

Wireless communications circuitry 20 may include antenna sharing circuitry that allows antennas 26 to be shared by the WiFi and Bluetooth transceivers of circuitry 22. Circuitry 20 may include one or more frequency-dependent multiplexing elements such as diplexers 63 and 65 (FIGS. 4 and 5) and diplexer 64 (FIGS. 6, 7, 8, and 9). Circuitry 20 may also include switching circuitry such as switch 112 (FIG. 5); switches 120 and 130 (FIGS. 6 and 9); switches 138 and 146 (FIG. 7); switches 154, 162, 170, and 178 (FIG. 8); and switches 204 and 212 (FIG. 10). The states of these switches may be adjusted during operation of circuitry 20 to route transmitted and received radio-frequency signals to appropriate locations.

In the example of FIG. 4, radio-frequency transceiver circuitry 22 may transmit signals in the 5 GHz WiFi band using output path 30 and may transmit signals in the 2.4 GHz WiFi band using output path 40. Paths 30 and 40 may be connected to diplexer 65. If desired, path 30 may include amplifier 222 to boost the transmitted signals on path 30.

Diplexer 65 serves as a frequency-dependent multiplexing element. Diplexer 65 may receive signals at 2.4 GHz and 5 GHz over paths 30 and 40. The 2.4 GHz and the 5 GHz signals may be routed to path 62 (e.g., to antennas 26) by diplexer 65.

Diplexers such as diplexers 63, 64, 65, and 70 may be implemented using any suitable radio-frequency components. With one suitable arrangement, diplexers 63, 64, 65, and 70 may be implemented using filters such as filters 66, 68, and 69. Diplexers 63, 64, and 65 may use filters 66 and 68 and diplexer 70 may use filters 68 and 69, as examples. Filter 66 may be a 2.4 GHz low-pass filter that passes radio-frequency signals at frequencies below 2.5 GHz (as an example). Filter 68 may be a 5 GHz high-pass filter that passes radio-frequency signals at frequencies above 4.8 GHz or above 4.9 GHz (as an example). Filter 69 may be a 2.4 GHz bandpass filter that passes radio-frequency signals in the range of 2.4 to 2.5 GHz (as an example). More extensive filtering may be performed using filters such as filters 74, 76, 77, 86, and 88. Filter 74 may be a 2.4 GHz low-pass filter that passes radio-frequency signals at frequencies below 2.5 GHz or may be a 2.4 GHz bandpass filter that passes radio-frequency signals in the range of 2.4 to 2.5 GHz (as examples). Filter 76 may be a 2.4 GHz bandpass filter that passes radio-frequency signals in the range of 2.4 to 2.5 GHz (as an example). Filter 77 may be a 2.4 GHz bandpass filter that passes radio-frequency signals in the range of 2.4 to 2.5 GHz (as an example). Filter 86 may be a 2.4 GHz bandpass filter that passes radio-frequency signals in the range of 2.4 to 2.5 GHz (as an example). Filter 88 may be a 5 GHz bandpass filter that passes radio-frequency signals in the range of 4.9 GHz to 6 GHz (as an example).

In the example of FIG. 4, Bluetooth signals at 2.4 GHz may be transmitted from circuitry 22 using antenna 27. As examples, Bluetooth transceiver 110 or other radio-frequency transceiver circuitry 22 may generate Bluetooth transmission signals that are conveyed to Bluetooth antenna 27 over transmission path 44.

In the example of FIG. 4, path 82 and diplexer 63 may be used to route incoming radio-frequency signals from antennas 26 to input paths 32 and 42 of radio-frequency transceiver circuitry 22. Input path 42 may carry signals in the 2.4 GHz WiFi band and signals in the 2.4 GHz Bluetooth band. Input path 32 may carry signals in the 5 GHz WiFi band.

If desired, circuitry 20 may include one or more (optional) amplifiers such as low noise amplifiers 92. Low-noise amplifiers 92 may be controlled by circuitry 22 using one or more enable signals such as the signal "ENABLE" on line 34. When the signal ENABLE on line 34 is asserted by radio-frequency transceiver circuitry 22, low-noise amplifiers 92 will be turned on. When not required to amplify incoming signals, low-noise amplifiers 92 can be disabled to conserve power by deasserting the ENABLE signal. As shown in the dashed outlines of lines 34 and amplifiers 92 in FIG. 4, circuitry 20 may include an amplifier in path 82, an amplifier in path 42, and/or an amplifier in path 32 (as examples).

With the arrangement shown in FIG. 4, device 10 may be able to maximize the airtime of Bluetooth transmission (because Bluetooth transmission path 44 may be coupled to a dedicated Bluetooth antenna 27). In addition, there may be relatively little crosstalk between the 2.4 GHz transmission path 40 (e.g., transmission line 40) and the 5 GHz receiving line 32 (because crosstalk signals may have to pass through diplexers 63 and 65 to cross between path 40 and line 32). Also, it may be possible to simultaneously transmit 2.4 GHz and 5 GHz signals for wireless communications (because paths 30 and 40 are simultaneously connected to antennas). It may be desirable to include relatively robust antennas 26 in circuitry of the type shown in FIG. 4 to reduce the risk of one of the antennas 26 breaking. In addition, it may be desirable to provide antennas 26 that are relatively isolated from each other to reduce potential crosstalk signals between the two antennas 26 during the simultaneous operation of the two antennas 26. If desired, diplexers 63 and 65 may include relatively high quality filters to reduce potential cross talk signals from cellular telephone antenna 100 and from the two antennas 26. With one suitable arrangement, filters may be included in path 30 (e.g., the 5 GHz transmission line) to provide harmonic filtering for path 30.

FIGS. 5, 6, 7, 8, 9, and 10 illustrate alternative arrangements for providing wireless communications circuitry 20. If desired, any of the alternative arrangements described in connection with FIGS. 4, 5, 6, 7, 8, 9, and 10 may be applied in any of the other examples in FIGS. 4, 5, 6, 7, 8, 9, and 10.

Figure 5:
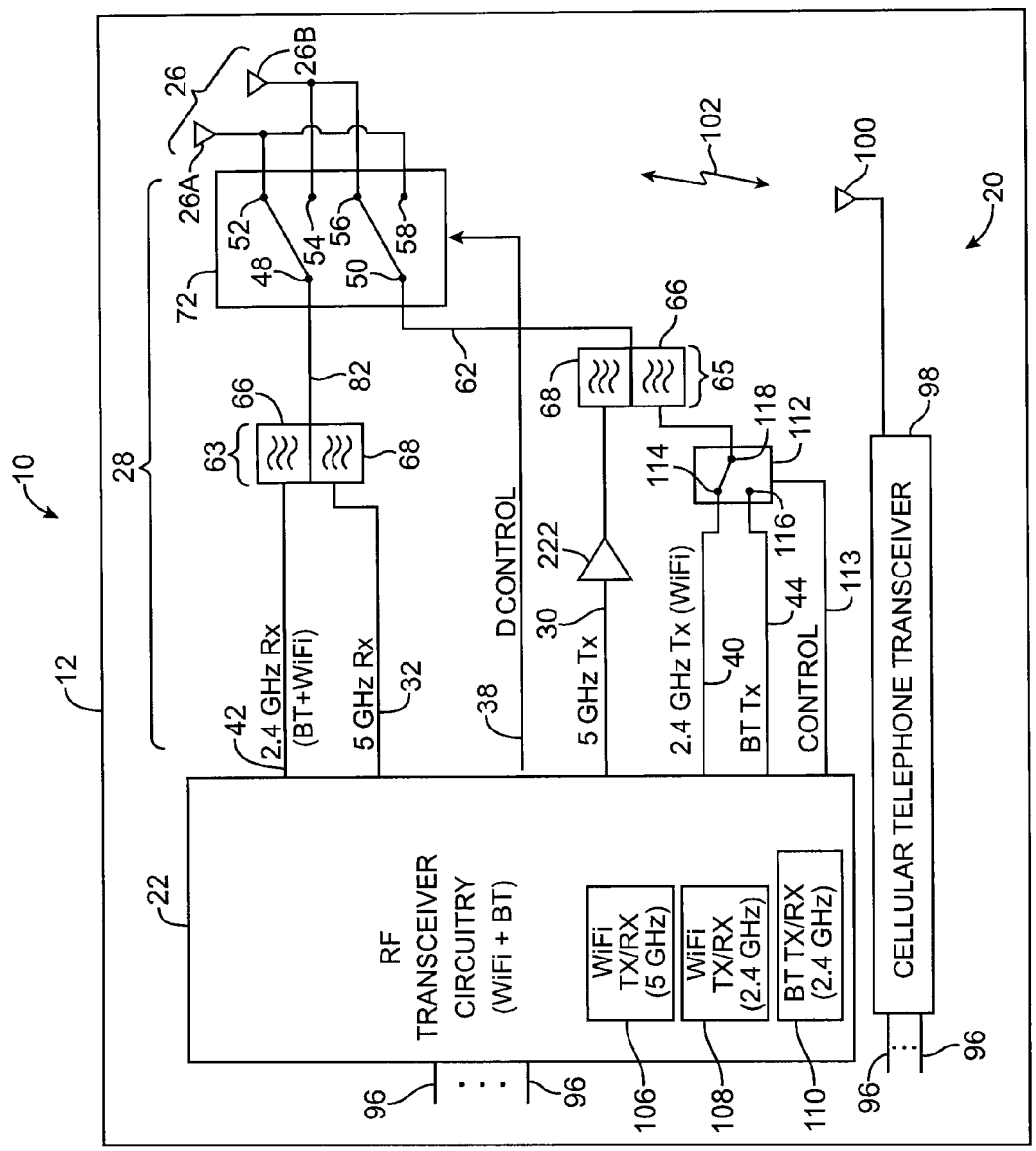
FIG. 5 is a detailed schematic diagram of wireless communications circuitry that may include two diplexers and two switches for a wireless electronic device in accordance with an embodiment of the present invention.

The arrangement of FIG. 5 may have many of the same benefits as FIG. 4 while simultaneously reducing the number of antennas in device 10 (e.g., by eliminating the dedicated Bluetooth antenna 27 of FIG. 4). Because device 10 of FIG. 5 need not include a dedicated Bluetooth antenna, it may be desirable to implement a time-sharing technique or other suitable technique to maximize the coexistence of Bluetooth transmissions and 2.4 GHz WiFi transmissions (e.g., to maximize the airtimes of Bluetooth and 2.4 GHz WiFi transmissions).

In the example of FIG. 5, the arrangement of FIG. 4 may be modified by utilizing a switch such as switch 72 to route Bluetooth transmission signals to path 62 and antenna 26. If desired, this type of arrangement may be used in an electronic device that does not include a dedicated Bluetooth antenna such as antenna 27 (as an example). As shown in FIG. 5, Bluetooth signals at 2.4 GHz may be transmitted from circuitry 22 using antennas 26 (e.g., using one of the two antennas 26A or 26B). As examples, Bluetooth transceiver 110 or radio-frequency transceiver circuitry 22 may generate Bluetooth transmission signals that are conveyed to terminal 116 of switch 112. Radio-frequency transceiver circuitry 22 may generate transmission signals in the 2.4 GHz WiFi band using output path 40 that are conveyed to terminal 114 of switch 112.

Switch 112 may be used to connect terminal 118 to either terminal 114 or terminal 116 depending on the state of one or more control signals. These control signals may be provided to switch 112 from radio-frequency transceiver circuitry 22 over one or more control lines. These control lines and associated control signals are shown as control path 113 and control signal CONTROL in FIG. 5. When terminal 114 is connected to terminal 118, 2.4 GHz WiFi signals can be transmitted from radio-frequency transceiver circuitry 22 using one of antennas 26. When terminal 116 is connected to terminal 118, Bluetooth transmission signals can be transmitted from radio-frequency transceiver circuitry 22 using one of antennas 26.

Figure 6:
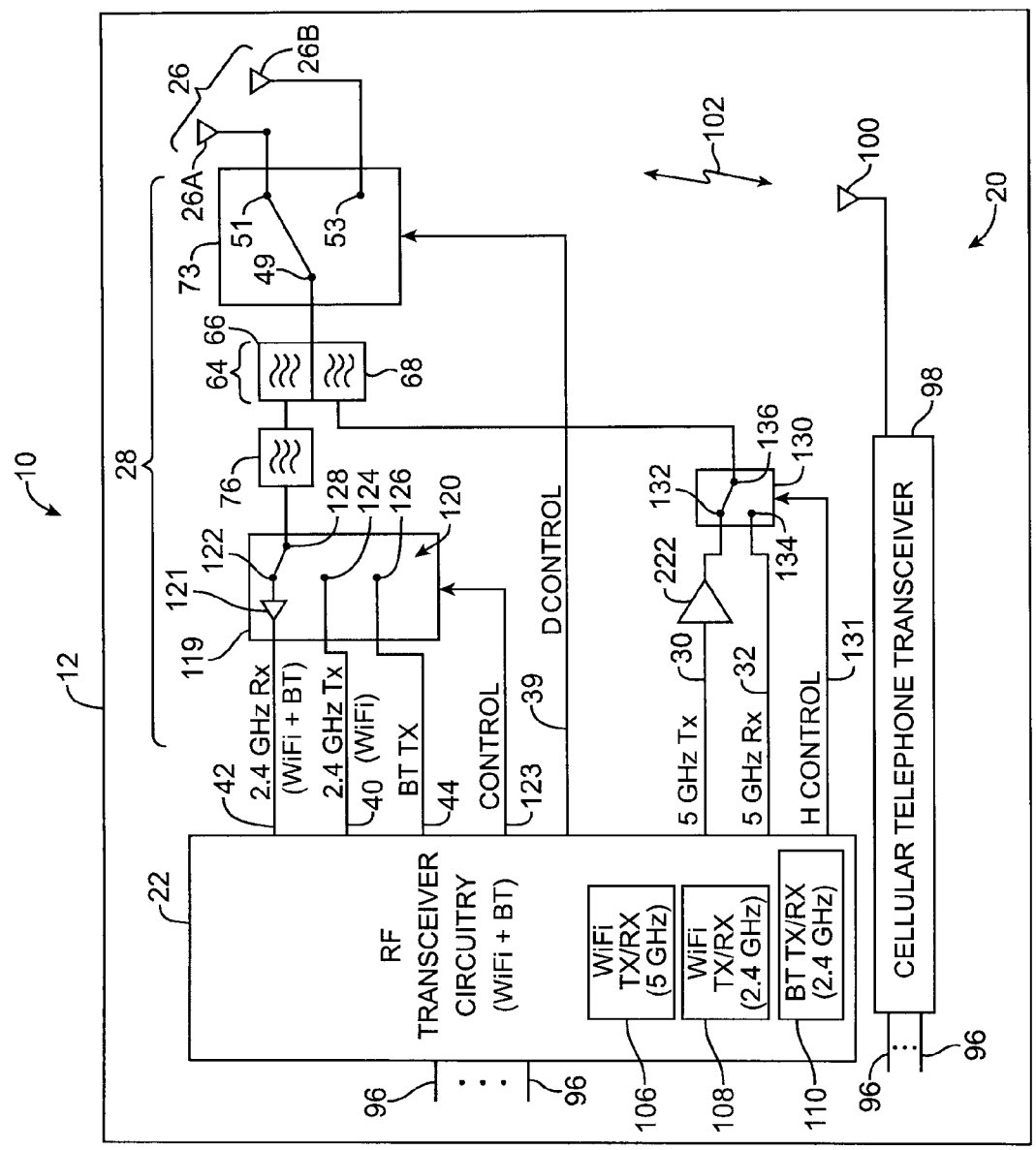
FIG. 6 is a detailed schematic diagram of wireless communications circuitry that may include a diplexer and three switches for a wireless electronic device in accordance with an embodiment of the present invention.
Figure 7:
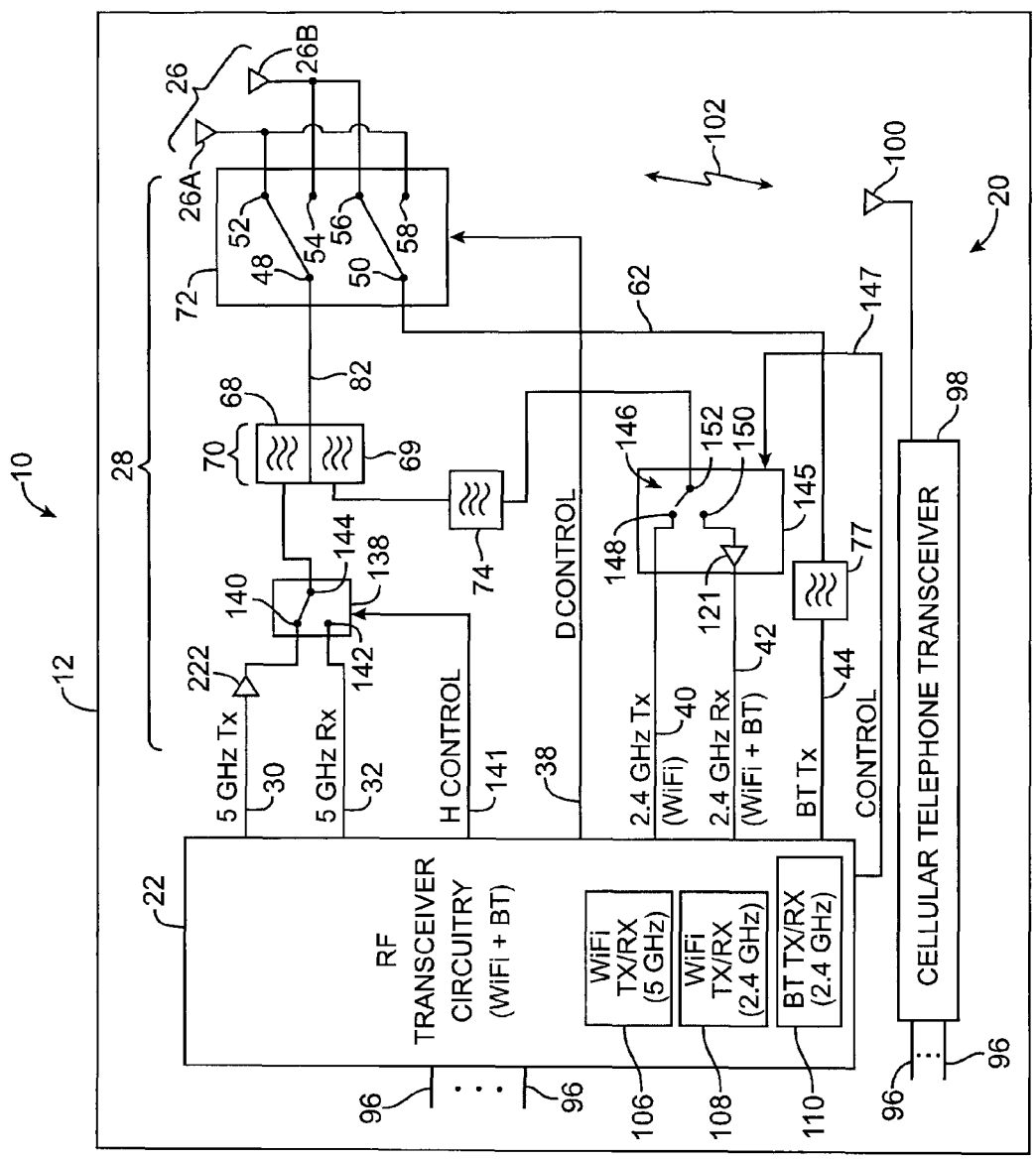
FIG. 7 is a detailed schematic diagram of wireless communications circuitry that may include a diplexer and three switches for a wireless electronic device and that may include a transmission line dedicated to signals in a given communications band in accordance with an embodiment of the present invention.

In the FIG. 6 example, filter 76 may be connected to filter 66 and, in the FIG. 7 example, filter 74 may be connected to filter 69. By using both filters 76 and 66 and/or filters 74 and 69 together, filtering for the 2.4 GHz signal path in circuitry 20 can be enhanced, without incurring large insertion losses. If desired, the filtering circuitry of filters 76 and 66 and/or filters 74 and 69 may be implemented using a unitary device, although this will typically result in a somewhat increased insertion loss penalty. In addition to exhibiting low insertion losses, the use of separate filters 76 and 66 and/or 74 and 69 may help to reduce leaked 5 GHz signals in diplexers 64 and 70 (respectively) from propagating to the input of the 2.4 GHz receiver circuitry in circuitry 22 during 5 GHz transmission operations. The bulk (e.g., 90%) of the filtering performed by filters 76 and 66 with the FIG. 6 arrangement will generally be provided by filter 76. The bulk (e.g., 90%) of the filtering performed by filters 74 and 69 with the FIG. 7 arrangement will generally be provided by filter 74.

In the example of FIG. 6, circuitry 20 may include a diplexer 64 coupled to switching circuitry 73 and antennas 26. Diplexer 64 may convey 2.4 GHz radio-frequency signals between switch 120 and switching circuitry 73 and may convey 5 GHz radio-frequency signals between switch 130 and switching circuitry 73 (as examples). With one suitable arrangement, diplexer 64 of FIG. 6 may include 5 GHz high-pass filter 68 and 2.4 GHz low-pass filter 66. If desired, circuitry 20 may include filter 76 between switch 120 and diplexer 64. Filter 76 may be formed from a 2.4 GHz bandpass filter and, as one example, may help to block 5 GHz transmission signals from path 30 leaking into terminal 128 (and path 42) and may help to block radio-frequency telephone signals that have been coupled into antennas 26 via path 102 from propagating to terminal 128 (and path 42).

Switch 120 may be implemented as part of a larger circuit such as circuit 119. Circuit 119 may be, for example, an integrated circuit that contains an integrated low-noise radio-frequency input amplifier such as amplifier 121. Components such as these may also be provided using one or more separate devices. The arrangement of FIG. 6, in which low-noise amplifier 121 and switch 120 are implemented as parts of a common integrated circuit 119 is merely illustrative.

Switch 120 may be a three-position switch (as an example). With a three-position configuration, switch 120 may be used to connect terminal 128 to terminal 122, terminal 124, or terminal 126. Control signals CONTROL may be provided to switch 120 from radio-frequency transceiver 22 to select which of the three positions is used.

When it is desired to transmit 2.4 GHz WiFi signals, control signals CONTROL on path 123 may be used to direct switch 120 to connect path 40 to terminal 128. In this configuration, 2.4 GHz WiFi signals that are transmitted on output path 40 by radio-frequency transceiver circuitry 22 may be routed to diplexer 64. Signals at 2.4 GHz may be routed from antennas 26 to 2.4 GHz input path 42 by placing switch 120 in position 122 and routing incoming signals to path 42 through low-noise amplifier 121. Transceiver circuitry 22 (e.g., circuitry 22 and the code running on transceiver circuitry 22) may be used to process simultaneously received 2.4 GHz Bluetooth signals and 2.4 GHz WiFi signals on path 42. Transceiver circuitry 22 may, for example, separately process Bluetooth and WiFi signals, allowing for simultaneous receive operations. When it is desired to transmit 2.4 Bluetooth signals, control signals CONTROL on path 123 may be used to direct switch 120 to connect path 44 to terminal 128. In this configuration, 2.4 GHz Bluetooth signals that are transmitted on output path 44 by radio-frequency transceiver circuitry 22 may be routed to diplexer 64.

Switch 130 may be used to connect diplexer 64 to either path 30 or path 32 depending on the state of one or more control signals. These control signals may be provided to switch 130 from radio-frequency transceiver circuitry 22 over one or more control lines. These control lines and associated control signals are shown as control path 131 and control signal HCONTROL in FIG. 6. When diplexer 64 is connected to path 30 (e.g., terminal 136 is connected to terminal 132), 5 GHz WiFi signals can be transmitted from radio-frequency transceiver circuitry 22 using one of antennas 26. When diplexer 64 is connected to path 32 (e.g., terminal 136 is connected to terminal 134), 5 GHz WiFi signals that have been received using antennas 26 can be routed to radio-frequency transceiver circuitry 22. If desired, path 30 may include amplifier 222 to boost the transmission signals on path 30. With another suitable arrangement, amplifier 222 may be integrated into radio-frequency transceiver circuitry 22 (e.g., amplifier 222 may be integrated into radio 106).

With the arrangement shown in FIG. 6, the coexistence of 2.4 GHz WiFi and Bluetooth signals and 5 GHz WiFi signals need not be dependent on the ability to implement a large amount of isolation between the two antennas 26 (e.g., there may be relatively poor isolation between each of the two antennas 26 without reducing coexistence between 2.4 GHz and 5 GHz signals). In addition, device 10 may be able to use whichever antenna currently has the strongest signal strengths, thereby maximizing wireless communications performance. The arrangement of FIG. 6 may also exhibit sufficient filtering to effectively eliminate crosstalk signals from cellular telephone antenna 100 and GPS antennas. If desired, diplexer 64 may include relatively high quality filters to reduce the amount of signals that leak from transmission lines 40 and/or 44 to receiving line 32 and to allow simultaneous transmission operations through transmission lines 40 and/or 44 and receiving operations through receiving line 32. With one suitable arrangement, filters may be included in path 30 (e.g., the 5 GHz transmission line) to provide harmonic filtering for path 30. In addition, the arrangement of FIG. 6 may provide redundancy in the event that one of the two antennas 26 breaks or fails (e.g., wireless communications can continue even if one of the two antennas 26 breaks).

In the example of FIG. 7, circuitry 20 may include a diplexer 70 and a Bluetooth transmission path 44 coupled to switching circuitry 72 and antennas 26. Path 44 (and path 62) may convey 2.4 GHz radio-frequency signals between circuitry 22 (radio 110) and switching circuitry 72. If desired, circuitry 20 may include filter 77 between output path 44 and switching circuitry 72. Filter 77 may be a 2.4 GHz bandpass filter that passes radio-frequency signals in the range of 2.4 to 2.5 GHz (as an example). With one suitable arrangement, diplexer 70 may convey 2.4 GHz radio-frequency signals between switch 146 and path 82 (e.g., switching circuitry 72) and may convey 5 GHz radio-frequency signals between switch 138 and path 82 (as examples). As an example, diplexer 70 of FIG. 7 may include 5 GHz high-pass filter 68 and 2.4 GHz bandpass filter 69. If desired, circuitry 20 may include filter 74 between switch 146 and diplexer 70. Filter 74 may be formed from a 2.4 GHz bandpass filter and, as one example, may help to block 5 GHz transmission signals from path 30 leaking into terminal 152 (and path 42) and may help to block radio-frequency telephone signals that have been coupled into antennas 26 via path 102 from propagating to terminal 152 (and path 42). With another suitable arrangement, filter 74 may be formed from a 2.4 GHz low-pass filter.

Switch 146 may be implemented as part of a larger circuit such as circuit 145. Circuit 145 may be, for example, an integrated circuit that contains an integrated low-noise radio-frequency input amplifier such as amplifier 121.

Switch 146 may be a two-position switch (as an example). With a two-position configuration, switch 146 may be used to connect terminal 152 to terminal 148 or terminal 150. Control signals CONTROL may be provided to switch 146 from radio-frequency transceiver 22 to select which of the two positions is used.

When it is desired to transmit 2.4 GHz WiFi signals, control signals CONTROL on path 147 may be used to direct switch 146 to connect path 40 to terminal 152. In this configuration, 2.4 GHz WiFi signals that are transmitted on output path 40 by radio-frequency transceiver circuitry 22 may be routed to diplexer 70. Signals at 2.4 GHz may be routed from antennas 26 to 2.4 GHz input path 42 by placing switch 146 in position 150 and routing incoming signals to path 42 through low-noise amplifier 121.

Switch 138 may be used to connect diplexer 70 to either path 30 or path 32 depending on the state of one or more control signals. These control signals may be provided to switch 138 from radio-frequency transceiver circuitry 22 over one or more control lines. These control lines and associated control signals are shown as control path 141 and control signal HCONTROL in FIG. 7. When diplexer 70 is connected to path 30 (e.g., terminal 144 is connected to terminal 140), 5 GHz WiFi signals can be transmitted from radio-frequency transceiver circuitry 22 using one of antennas 26. When diplexer 70 is connected to path 32 (e.g., terminal 144 is connected to terminal 142), 5 GHz WiFi signals that have been received using antennas 26 can be routed to radio-frequency transceiver circuitry 22. If desired, path 30 may include amplifier 222 to boost the transmission signals on path 30.

With the arrangement shown in FIG. 7, device 10 may be able to maximize the airtime of Bluetooth transmissions (because Bluetooth transmission path 44 may be almost continuously coupled to one of the antennas 26). In addition, the arrangement shown in FIG. 7 may facilitate the simultaneous transmission of Bluetooth signals while receiving 5 GHz WiFi signals. If desired, diplexer 70 may include relatively high quality filters to reduce crosstalk from antenna 100 and a GPS antenna in device 10, to reduce potential insertion losses, and to allow simultaneous transmission operations through transmission line 30 and receiving operations through receiving line 42 (as examples). With one suitable arrangement, filters may be included in path 30 (e.g., the 5 GHz transmission line) to provide harmonic filtering for path 30. It may be desirable to include relatively robust antennas 26 in the example of FIG. 7 to reduce the risk of one of the antennas 26 breaking.

Figure 8:
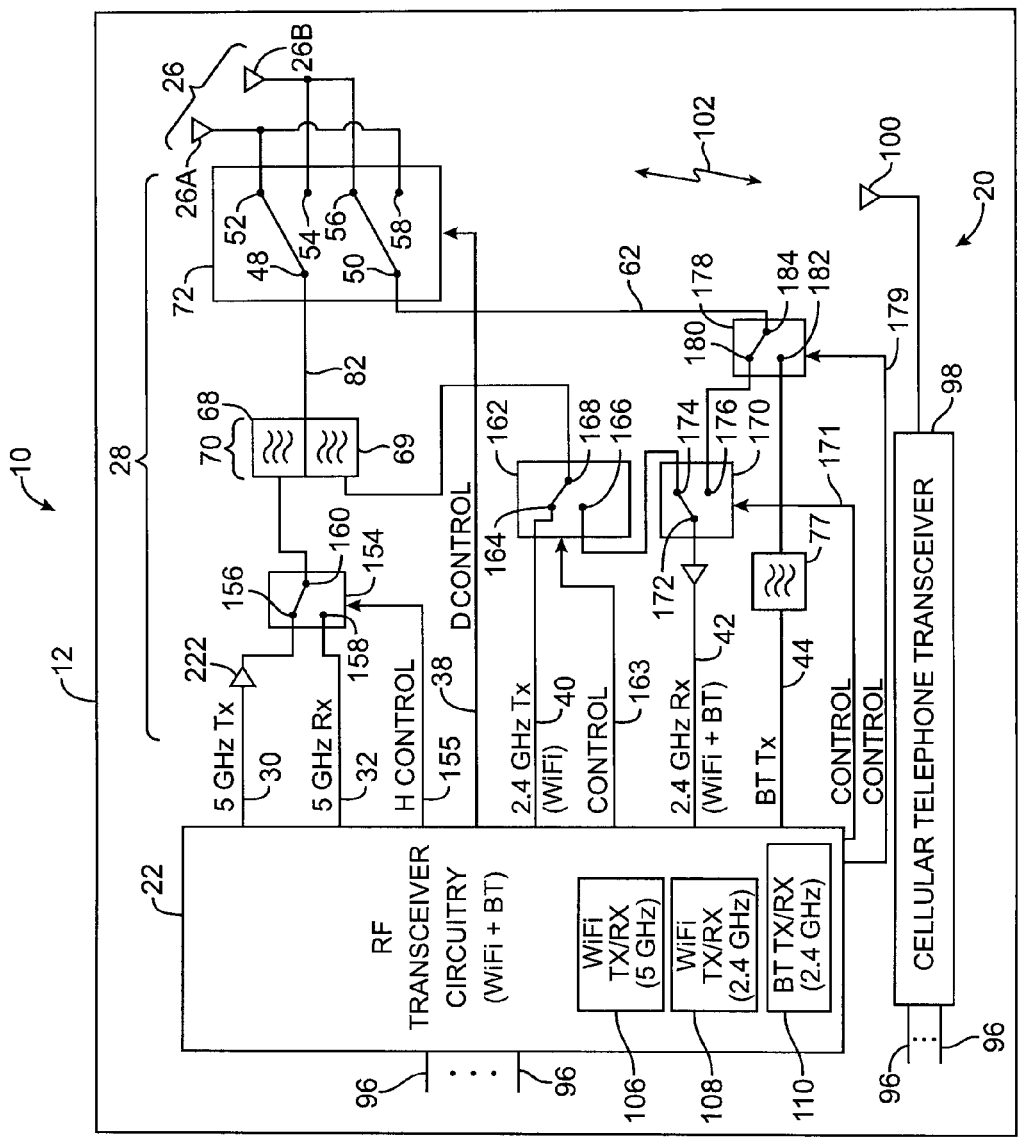
FIG. 8 is a detailed schematic diagram of wireless communications circuitry that may include a diplexer and five switches for a wireless electronic device in accordance with an embodiment of the present invention.

In the example of FIG. 8, circuitry 20 may include a diplexer 70 and switches 154, 162, 170, and 178. Diplexer 70 may convey 2.4 GHz radio-frequency signals between switch 162 and switching circuitry 72 and may convey 5 GHz radio-frequency signals between switch 154 and switching circuitry (as examples). With one suitable arrangement, diplexer 70 of FIG. 8 may include 5 GHz high-pass filter 68 and 2.4 GHz bandpass filter 69. If desired, circuitry 20 may include filter 77 between switch 178 and output path 44.

When it is desired to transmit 2.4 GHz WiFi signals, control signals CONTROL on path 163 may be used to direct switch 162 to connect path 40 to terminal 168. In this configuration, 2.4 GHz WiFi signals that are transmitted on output path 40 by radio-frequency transceiver circuitry 22 may be routed to diplexer 70.

When it is desired to route signals at 2.4 GHz from antennas 26 to 2.4 GHz input path 42, control signals CONTROL on path 163 and control signals CONTROL on path 171 may be used to direct switch 162 to connect diplexer 70 to terminal 174 of switch 170 and to direct switch 170 to connect terminal 174 to terminal 172. In this configuration, signals at 2.4 GHz may be routed from antennas 26 to 2.4 GHz input path 42 by placing switch 162 in position 166 and by placing switch 170 in position 174 and routing incoming signals to path 42.

With another suitable arrangement, signals at 2.4 GHz may be routed from antenna 26 to input path 42 through switches 178 and 170. With this type of arrangement, control signals CONTROL on path 179 and control signals CONTROL on path 171 may be used to direct switch 178 to connect path 62 to switch 170 (e.g., connect terminal 184 to terminal 180) and to direct switch 170 to connect terminal 176 to terminal 172.

When it is desired to transmit 2.4 Bluetooth signals, control signals CONTROL on path 179 may be used to direct switch 178 to connect path 44 to path 62 (e.g., to connect terminals 182 and 184). In this configuration, 2.4 GHz Bluetooth signals that are transmitted on output path 44 by radio-frequency transceiver circuitry 22 may be routed to antennas 26.

Switch 154 may be used to connect diplexer 70 to either path 30 or 32 depending on the state of one or more control signals. These control signals may be provided to switch 154 from radio-frequency transceiver circuitry 22 over one or more control lines. These control lines and associated control signals are shown as control path 155 and control signal HCONTROL in FIG. 8. When diplexer 70 is connected to path 30 (e.g., terminal 156 is connected to terminal 160), 5 GHz WiFi signals can be transmitted from radio-frequency transceiver circuitry 22 using one of antennas 26. When diplexer 70 is connected to path 32 (e.g., terminal 158 is connected to terminal 160), 5 GHz WiFi signals that have been received using antennas 26 can be routed to radio-frequency transceiver circuitry 22. If desired, path 30 may include amplifier 222 to boost the transmission signals on path 30.

In the arrangement shown in FIG. 8, it may be desirable to provide antennas 26 that are relatively isolated from each other to reduce potential crosstalk signals between the two antennas 26 during the simultaneous operation of the two antennas 26 (e.g., during the simultaneous transmission of Bluetooth signals on path 44 and the reception of signals on path 30). If desired, the switches of FIG. 8 may be optimized to reduce insertion losses and to reduce the cost to manufacture the switches. As an example, diplexer 70 may include relatively high quality filters to reduce crosstalk between the two antennas 26, to reduce potential insertion losses, to allow simultaneous transmission operations through transmission line 30 and receiving operations through receiving line 42 (e.g., when receiving line 42 is coupled to the same antenna as line 30), and to reduce crosstalk from antenna 100 and a GPS antenna in device 10.

Figure 9:
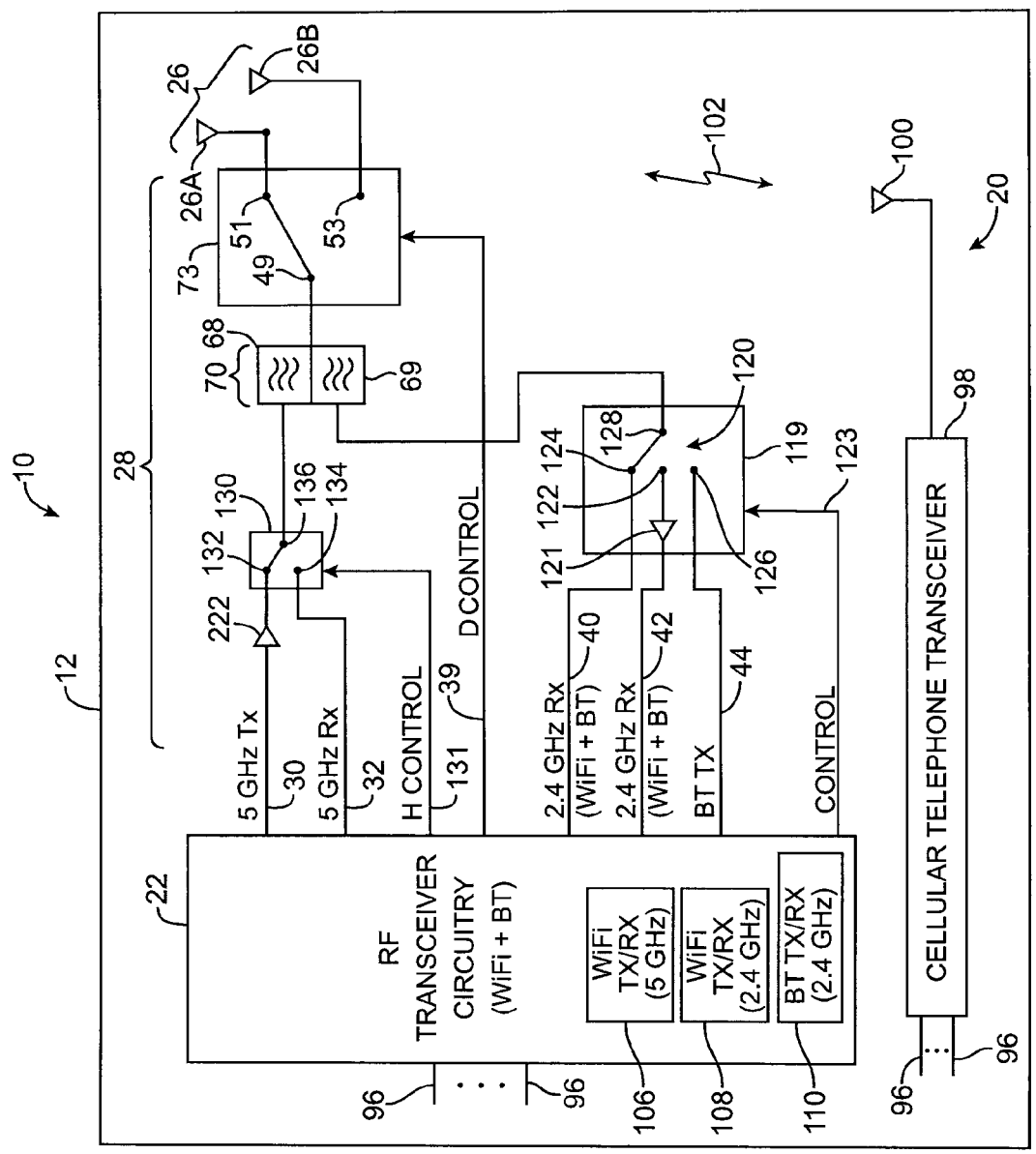
FIG. 9 is a detailed schematic diagram of wireless communications circuitry that may include a diplexer with a high-pass filter and a bandpass filter and three switches for a wireless electronic device in accordance with an embodiment of the present invention.
Figure 10:
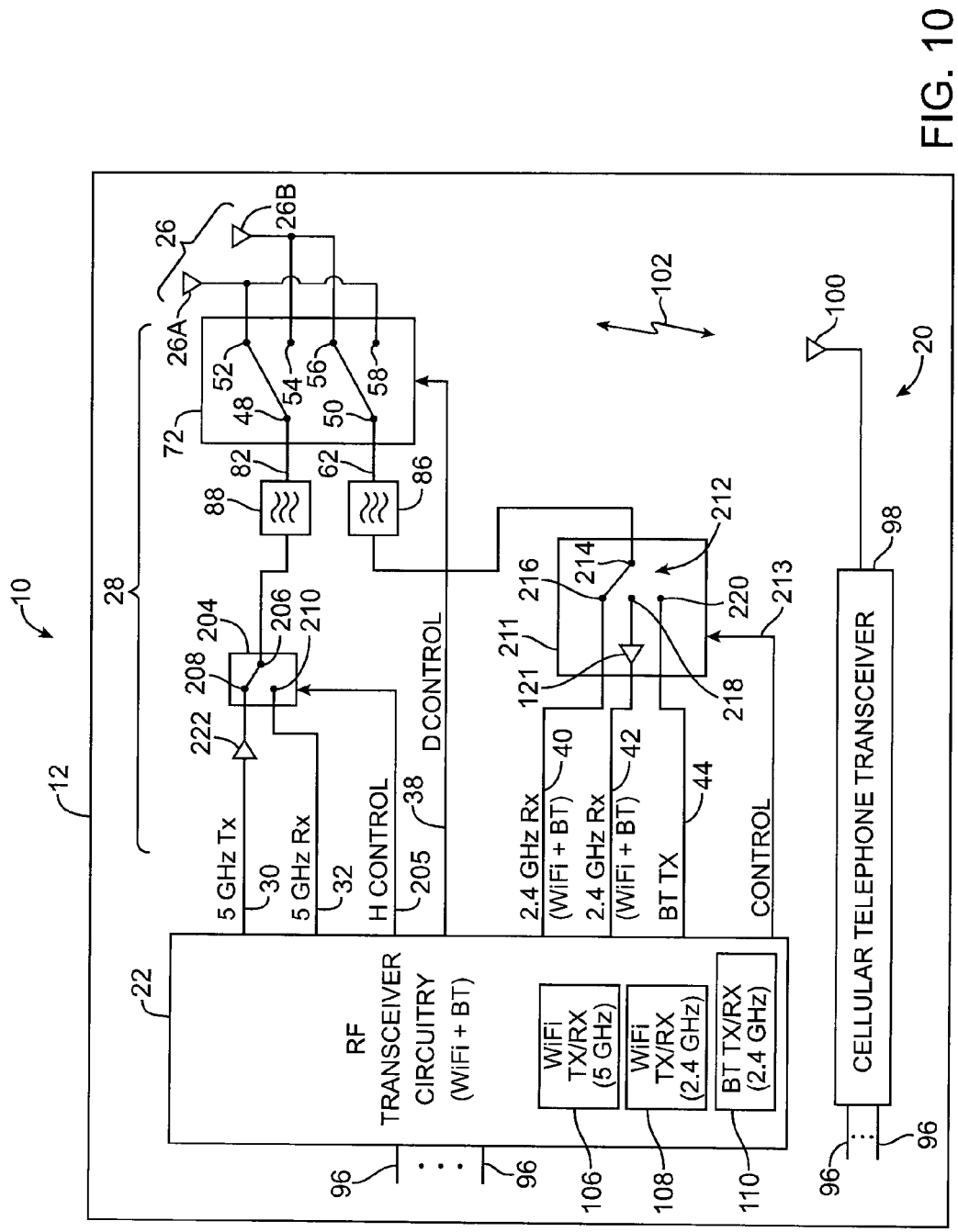
FIG. 10 is a detailed schematic diagram of wireless communications circuitry that may include two bandpass filters and three switches for a wireless electronic device in accordance with an embodiment of the present invention.

As shown in FIG. 9, the arrangement of FIG. 6 may be modified by utilizing diplexer 70 (rather than diplexer 64). Diplexer 70 may include filters 68 and 69. Filter 68 may be a 5 GHz high-pass filter that passes radio-frequency signals at frequencies above 4.8 GHz or above 4.9 GHz (as an example). Filter 69 may be a 2.4 GHz bandpass filter that passes radio-frequency signals in the range of 2.4 to 2.5 GHz (as an example). If desired, filter 76 may not be included in the circuitry 20 of FIG. 9. With this type of arrangement, diplexer 70 serves as the primary source of filtering between antennas 26 and circuitry 22. With one suitable arrangement, diplexer 70 of FIG. 9 may be a relatively high performance diplexer in order to ensure sufficient filtering.

With the arrangement shown in FIG. 9, the coexistence of 2.4 GHz WiFi and Bluetooth signals and 5 GHz WiFi signals may not be dependent on the isolation between the two antennas 26 (e.g., there may be relatively poor isolation between each of the two antennas 26 without reducing the ability to support coexistence between 2.4 GHz and 5 GHz signals). In addition, the arrangement of FIG. 9 may provide redundancy in the event that one of the two antennas 26 breaks or fails (e.g., wireless communications can continue even if one of the two antennas 26 breaks). If desired, diplexer 70 may include relatively high quality filters to reduce insertion losses, to reduce cross talk from cellular telephone antenna 100, to allow simultaneous transmission of Bluetooth signals over path 44 and reception of 5 GHz WiFi signals over path 32, and to allow simultaneous transmission of 5 GHz WiFi signals over path 30 and reception of Bluetooth signals over path 42. With one suitable arrangement, filters may be included in path 30 (e.g., the 5 GHz transmission line) to provide harmonic filtering for path 30.

As shown in FIG. 10, circuitry 20 may include filters 86 and 88 and switches 204 and 212. Filter 86 may be a 2.4 GHz bandpass filter that passes radio-frequency signals in the range of 2.4 to 2.5 GHz (as an example). Filter 88 may be a 5 GHz bandpass filter that passes radio-frequency signals in the range of 4.9 GHz to 6 GHz (as an example). As shown in FIG.

10, filter 88 may convey 5 GHz radio-frequency signals between switch 204 and antennas 26 (e.g., path 82) while filter 86 may convey 2.4 GHz radio-frequency signals between switch 212 and antennas 26 (e.g., path 62).

When, for example, antenna 26A is performing better than antenna 26B, switching circuitry 72 may be used to switch antenna 26A into use for wireless transmissions by coupling antenna 26A to lines carrying transmission signals (e.g., coupling antenna 26A to path 82 or path 62 depending on which path is currently being used to convey transmission signals) and to switch antenna 26B into use by coupling antenna 26B to wireless receivers in circuitry 22 through receiver lines (e.g., coupling antenna 26B to path 82 or path 62 depending on which path is currently being used to receive signals). When, for example, antenna 26B is performing better than antenna 26A, switching circuitry 72 may be used to switch antenna 26B into use for wireless transmissions by coupling antenna 26B to lines carrying transmission signals and to switch antenna 26A into use by coupling antenna 26A to wireless receivers in circuitry 22 through receiver lines.

Switch 212 may be implemented as part of a larger circuit such as circuit 211. Circuit 211 may be, for example, an integrated circuit that contains an integrated low-noise radio-frequency input amplifier such as amplifier 121. Components such as these may also be provided using one or more separate devices. The arrangement of FIG. 10, in which low-noise amplifier 121 and switch 212 are implemented as parts of a common integrated circuit 211 is merely illustrative.

Switch 212 may be a three-position switch (as an example). With a three-position configuration, switch 212 may be used to connect terminal 214 to terminal 216, terminal 218, or terminal 220. Control signals CONTROL may be provided to switch 120 from radio-frequency transceiver 22 to select which of the three positions is used.

When it is desired to transmit 2.4 GHz WiFi signals, control signals CONTROL on path 213 may be used to direct switch 214 to connect path 40 to terminal 214. In this configuration, 2.4 GHz WiFi signals that are transmitted on output path 40 by radio-frequency transceiver circuitry 22 may be routed to filter 86 and terminal 50 of circuitry 72. Signals at 2.4 GHz may be routed from antennas 26 to 2.4 GHz input path 42 by placing switch 212 in position 218 and routing incoming signals to path 42 through low-noise amplifier 121. When it is desired to transmit 2.4 Bluetooth signals, control signals CONTROL on path 213 may be used to direct switch 212 to connect path 44 to terminal 214. In this configuration, 2.4 GHz Bluetooth signals that are transmitted on output path 44 by radio-frequency transceiver circuitry 22 may be routed to antennas 26.

Switch 204 may be used to connect filter 88 (e.g., path 82 and terminal 48 of circuitry 72) to either path 30 or path 32 depending on the state of one or more control signals. These control signals may be provided to switch 204 from radio-frequency transceiver circuitry 22 over one or more control lines. These control lines and associated control signals are shown as control path 205 and control signal HCONTROL in FIG. 10. When filter 88 is connected to path 30 (e.g., terminal 208 is connected to terminal 206), 5 GHz WiFi signals can be transmitted from radio-frequency transceiver circuitry 22 using one of antennas 26. When filter 88 is connected to path 32 (e.g., terminal 206 is connected to terminal 210), 5 GHz WiFi signals that have been received using antennas 26 can be routed to radio-frequency transceiver circuitry 22. If desired, path 30 may include amplifier 222 to boost the transmission signals on path 30.

In the arrangement of FIG. 10, the use of filters 86 and 88 may allow coexistence of 5 GHz signals, 2.4 GHz signals, cellular telephone signals, and GPS signals by effectively eliminating crosstalk signals (even if the two antennas 26 are poorly isolated and/or terminals 48 and 50 of switch 72 are poorly isolated). In addition, the filters of FIG. 10 may effectively filter out any harmonics on the 5 GHz transmission line 30. With one suitable arrangement, filter 88 may be formed from a relatively high quality filter to reduce any insertion loss penalties associated with conveying signals from 5 GHz transmission path 30 to switch 72. In addition, it may be desirable to include relatively robust antennas 26 in the example of FIG. 10 to reduce the risk of one of the antennas 26 breaking.

Any of the illustrative architectures of FIGS. 4, 5, 6, 7, 8, 9, and 10 can be used to simultaneously implement antenna diversity and antenna sharing functions. Antenna diversity may be implemented by using switching circuitry 72 or switching circuitry 73 to switch antennas 26A or 26B into use as appropriate to optimize signals strength. Antenna sharing may be implemented by using switching circuitry such as circuitry 112, 120, 130, 138, 146, 154, 162, 170, 178, 204, and 212 and associated filter circuitry to selectively route 2.4 GHz and 5 GHz signals between the input-output ports associated with circuitry 22 and antennas 26. The use of this antenna sharing circuitry allows a single antenna structure (i.e., the diversity antenna implemented using antennas 26A and 26B) to be used for both 5 GHz and 2.4 GHz signals and to be used for both WiFi and Bluetooth traffic. Antennas 26A and 26B may each be implemented using multiband designs that cover both the 2.4 GHz and 5 GHz bands.

Because of the potential close proximity of other wireless components in housing 12 of device 10 such as cellular telephone transceiver 98 and cellular telephone antenna 100, there is a potential for undesirable radio-frequency interference with the 2.4 GHz and 5 GHz operations of circuitry 22. In particular, when a user is operating device 10 so that cellular telephone transceiver 98 is active, radio-frequency telephone signals from transceiver 98 may be coupled into antennas 26 via path 102. Even though antennas 26 are not nominally designed to handle cellular telephone frequencies, the close proximity of antenna 100 to antennas 26 may allow a non-zero amount of cellular telephone signals to be introduced onto antennas 26. These signals may be effectively eliminated using filtering circuitry such as the filtering circuitry of diplexers 63, 64, 65, and 70 and filtering circuitry 74, 76, 77, 86, and 88 (as examples). In particular, the use of diplexers and filtering circuitry may reduce cellular crosstalk by 10-20 dB (for signals at frequencies from about 1800 MHz to 2100 MHz) to 50 dB (for signals at frequencies of about 850 MHz to 900 MHz).

Device 10 can use circuitry 20 to support various operating modes in which 5 GHz WiFi signals are conveyed over antennas 26 while simultaneously handling 2.4 GHz signals. For example, 5 GHz WiFi signals may be transmitted, while simultaneously transmitting and/or receiving 2.4 GHz signals (e.g., for Bluetooth and/or WiFi). WiFi signals at 5 GHz may be received, while simultaneously receiving 2.4 GHz signals (e.g., for Bluetooth and/or WiFi). WiFi operations at 5 GHz may also be supported simultaneously with 2.4 GHz WiFi transmission and 2.4 GHz Bluetooth transmission operations. For example, 5 GHz WiFi signals may be transmitted, while simultaneously transmitting 2.4 GHz WiFi signals. WiFi signals at 5 GHz may also be transmitted, while simultaneously transmitting 2.4 GHz Bluetooth signals. WiFi 5 GHz signals may be received, while simultaneously transmitting 2.4 GHz WiFi signals. WiFi signals at 5 GHz may also be received, while simultaneously transmitting 2.4 GHz Bluetooth signals. If desired, radio-frequency transceiver circuitry 22 with different input and output ports may be used to support additional operating modes. The arrangements of FIGS. 4, 5, 6, 7, 8, 9, and 10 are shown as examples. During all of these modes, circuitry 22 may control antenna diversity switching circuitry 72 and/or antenna diversity switching circuitry 73 in real time to implement an antenna diversity scheme using antennas 26A and 26B.

The foregoing is merely illustrative of the principles of this invention and various modifications can be made by those skilled in the art without departing from the scope and spirit of the invention.

What is claimed is:

1. A portable electronic device, comprising:
   an antenna structure having a first antenna and a second antenna;
   an antenna diversity switch that selectively switches the first and second antennas into use in response to antenna diversity control signals;
   radio-frequency transceiver circuitry that transmits and receives radio-frequency signals through the antenna diversity switch, wherein the radio-frequency signals include radio-frequency signals in a first communications band and radio-frequency signals in a second communications band;
   a diplexer coupled between the antenna structure and the radio-frequency transceiver circuitry, wherein the diplexer has terminals respectively connected to:
      a first path that conveys the radio-frequency signals in the first communications band;
      a second path that conveys the radio-frequency signals in the second communications band; and
      an antenna path coupled to the antenna diversity switch;
   an output amplifier in the second path that is interposed between the radio-frequency transceiver circuitry and the diplexer; and
   a two-position switch interposed in the second path and a three-position switch interposed in the first path.

2. The portable electronic device defined in claim 1 wherein the first and second antennas each cover 2.4 GHz and 5 GHz communications bands and wherein the antenna diversity control signals direct the antenna diversity switch to switch either the first antenna or the second antenna into use.

3. The portable electronic device defined in claim 1 further comprising a cellular telephone transceiver and cellular telephone antenna.

4. The portable electronic device defined in claim 1 wherein the diplexer comprises a low-pass filter and a high-pass filter interposed between the antenna structure and the radio-frequency transceiver circuitry, the portable electronic device further comprising a bandpass filter interposed between the diplexer and the radio-frequency transceiver circuitry.

5. The portable electronic device defined in claim 1 wherein the diplexer comprises a bandpass filter and a high-pass filter interposed between the antenna structure and the radio-frequency transceiver circuitry.

6. Wireless communications circuitry comprising:
   a 5 GHz radio-frequency transceiver that operates in a 5 GHz communications band and a 2.4 GHz radio-frequency transceiver that operates in a 2.4 GHz band;
   an antenna structure with first and second antennas;
   a first bandpass filter that is interposed between the 5 GHz radio-frequency transceiver and the antenna structure;
   a second bandpass filter that is interposed between the 2.4 GHz radio-frequency transceiver and the antenna structure;
   an antenna diversity switch, wherein the antenna diversity switch has terminals respectively coupled to:
      the first antenna;
      the second antenna;
      the first bandpass filter; and
      the second bandpass filter; and
   a two-position switch and a three-position switch.

7. The wireless communications circuitry defined in claim 6 wherein the antenna diversity switch is configurable in:
   a first configuration in which the first antenna is coupled to the first bandpass filter and the second antenna is coupled to the second bandpass filter; and
   a second configuration in which the first antenna is coupled to the second bandpass filter and the second antenna is coupled to the first bandpass filter.

8. The wireless communications circuitry defined in claim 6 wherein the two-position switch is coupled between the first bandpass filter and the 5 GHz radio-frequency transceiver.

9. The wireless communications circuitry defined in claim 6 wherein the three-position switch is coupled between the second bandpass filter and the 2.4 GHz radio-frequency transceiver.

10. The wireless communications circuitry defined in claim 6 further comprising a cellular telephone transceiver and cellular telephone antenna.

11. An electronic device comprising:
    a housing;
    transceiver circuitry in the housing that handles wireless local area network radio-frequency signals at 5 GHz and radio-frequency signals at 2.4 GHz;
    an antenna structure in the housing with first and second antennas;
    a cellular telephone transceiver and cellular telephone antenna in the housing;
    a diplexer coupled between the antenna structure and the radio-frequency transceiver circuitry; and
    an antenna diversity switch, wherein the antenna diversity switch has terminals respectively coupled to:
       the first antenna;
       the second antenna;
       the diplexer; and
       a path coupled to the transceiver circuitry that bypasses the diplexer and that does not pass through a diplexer in the electronic device, wherein the antenna diversity switch is at least operable to simultaneously couple the first antenna to a first one of the diplexer and the path that bypasses the diplexer and couple the second antenna to a second one of the diplexer and the path that bypasses the diplexer.

12. The electronic device defined in claim 11 wherein the antenna diversity switch is configurable in:
    a first configuration in which the first antenna is coupled to the diplexer and the second antenna is coupled to the path that bypasses the diplexer; and
    a second configuration in which the second antenna is coupled to the diplexer and the first antenna is coupled to the path that bypasses the diplexer.

13. An electronic device comprising:
    a housing;
    transceiver circuitry in the housing that handles wireless local area network radio-frequency signals at 5 GHz and radio-frequency signals at 2.4 GHz;
    an antenna structure in the housing with first and second antennas;
    a cellular telephone transceiver and cellular telephone antenna in the housing;

a diplexer coupled between the antenna structure and the radio-frequency transceiver circuitry;
an antenna diversity switch, wherein the antenna diversity switch has terminals respectively coupled to:
the first antenna;
the second antenna;
the diplexer; and
a path coupled to the transceiver circuitry that bypasses the diplexer; and
a two-position switch with terminals respectively coupled to:
the diplexer;
a first path that conveys the radio-frequency signals at 5 GHz to the transceiver circuitry from the antenna structure; and
a second path that conveys the radio-frequency signals at 5 GHz from the transceiver circuitry to the antenna structure.

14. An electronic device comprising:
a housing;
transceiver circuitry in the housing that handles wireless local area network radio-frequency signals at 5 GHz and radio-frequency signals at 2.4 GHz;
an antenna structure in the housing with first and second antennas;
a cellular telephone transceiver and cellular telephone antenna in the housing;
a diplexer coupled between the antenna structure and the radio-frequency transceiver circuitry;
an antenna diversity switch, wherein the antenna diversity switch has terminals respectively coupled to:
the first antenna;
the second antenna;
the diplexer; and
a path coupled to the transceiver circuitry that bypasses the diplexer; and
first, second, and third two-position switches, wherein the first two-position switch has terminals coupled to:
the diplexer;
a first path that conveys the radio-frequency signals at 2.4 GHz from the transceiver circuitry to the antenna structure; and
the second two-position switch, wherein the second two-position switch has terminals coupled to:
the first two-position switch;
a second path that conveys the radio-frequency signals at 2.4 GHz to the transceiver circuitry from the antenna structure; and
the third two-position switch, and wherein the third two-position switch has terminals coupled to:
the second two-position switch;
the antenna structure; and
a third path that conveys the radio-frequency signals at 2.4 GHz from the transceiver circuitry to the antenna structure.

15. An electronic device comprising:
a housing;
transceiver circuitry in the housing that handles wireless local area network radio-frequency signals at 5 GHz and radio-frequency signals at 2.4 GHz;
an antenna structure in the housing with first and second antennas;
a cellular telephone transceiver and cellular telephone antenna in the housing;
a diplexer coupled between the antenna structure and the radio-frequency transceiver circuitry;
an antenna diversity switch, wherein the antenna diversity switch has terminals respectively coupled to:
the first antenna;
the second antenna;
the diplexer; and
a path coupled to the transceiver circuitry that bypasses the diplexer; and
first, second, and third two-position switches, wherein the first two-position switch is configurable in:
a first configuration in which the diplexer is coupled to a first path that conveys the radio-frequency signals at 2.4 GHz from the transceiver circuitry to the antenna structure; and
a second configuration in which the diplexer is coupled to a first terminal in the second two-position switch, wherein the second two-position switch is configurable in:
a first configuration in which the first terminal is coupled to a second path that conveys the radio-frequency signals at 2.4 GHz to the transceiver circuitry from the antenna structure; and
a second configuration in which the second path is coupled to a second terminal in the second two-position which, and wherein the third two-position switch is configurable in:
a first configuration in which the antenna structure is coupled to the path that bypasses the diplexer; and
a second configuration in which the antenna structure is coupled to the second terminal.

16. The electronic device defined in claim 11 further comprising a bandpass filter in the path that bypasses the diplexer.

* * * * *